US012715992B2

(12) United States Patent
Kurata et al.

(10) Patent No.: US 12,715,992 B2
(45) Date of Patent: Aug. 25, 2026

(54) POLYARYLENE SULFIDE RESIN COMPOSITION, MOLDED ARTICLE, AND METHODS FOR PRODUCING THESE

(71) Applicant: DIC Corporation, Tokyo (JP)

(72) Inventors: Kunito Kurata, Ichihara (JP); Tomomichi Kanda, Ichihara (JP); Hiroaki Negishi, Ichihara (JP)

(73) Assignee: DIC Corporation, Tokyo (JP)

( * ) Notice: Subject to any disclaimer, the term of this patent is extended or adjusted under 35 U.S.C. 154(b) by 720 days.

(21) Appl. No.: 18/015,375

(22) PCT Filed: Jun. 10, 2021

(86) PCT No.: PCT/JP2021/022022
§ 371 (c)(1),
(2) Date: Jan. 10, 2023

(87) PCT Pub. No.: WO2022/044482
PCT Pub. Date: Mar. 3, 2022

(65) Prior Publication Data

US 2023/0279228 A1 Sep. 7, 2023

(30) Foreign Application Priority Data

Aug. 25, 2020 (JP) ................................. 2020-141670

(51) Int. Cl.

| | |
|---|---|
| ***C08L 81/02*** | (2006.01) |
| ***B29C 48/00*** | (2019.01) |
| ***B29C 48/86*** | (2019.01) |
| ***B29K 81/00*** | (2006.01) |
| ***B29K 101/12*** | (2006.01) |
| ***B29K 105/08*** | (2006.01) |
| ***C08K 5/541*** | (2006.01) |
| ***C08K 7/14*** | (2006.01) |

(52) U.S. Cl.
CPC ............ *C08L 81/02* (2013.01); *B29C 48/022* (2019.02); *B29C 48/865* (2019.02); *C08K 5/541* (2013.01); *C08K 7/14* (2013.01); *B29K 2081/04* (2013.01); *B29K 2101/12* (2013.01); *B29K 2105/08* (2013.01); *C08L 2207/04* (2013.01)

(58) Field of Classification Search
CPC .... C08L 81/02; C08L 2207/04; B29C 48/022; B29C 48/865; C08K 5/541; C08K 7/14; B29K 2081/04; B29K 2101/12; B29K 2105/08
See application file for complete search history.

(56) References Cited

U.S. PATENT DOCUMENTS

| | | | | |
|---|---|---|---|---|
| 6,030,220 A * | 2/2000 | Karmaker | .............. A61K 6/836 | 433/180 |
| 11,390,744 B2 | 7/2022 | Yamada et al. | | |
| 2010/0069220 A1 | 3/2010 | McGinnis et al. | | |
| 2014/0364554 A1 | 12/2014 | Nonaka et al. | | |
| 2020/0115552 A1 | 4/2020 | Yamada et al. | | |

FOREIGN PATENT DOCUMENTS

| | | |
|---|---|---|
| JP | H10-7907 A | 1/1998 |
| JP | H10-279800 A | 10/1998 |
| JP | 2001-115020 A | 4/2001 |
| JP | 2009-514773 A | 4/2009 |
| KR | 10-2020-0026193 A | 3/2020 |
| WO | 2013/084892 A1 | 6/2013 |
| WO | 2018/066637 A1 | 4/2018 |

* cited by examiner

*Primary Examiner* — Shane Fang
(74) *Attorney, Agent, or Firm* — Troutman Pepper Locke LLP; James E. Armstrong, IV

(57) ABSTRACT

Provided are a molded article that contains a polyarylene sulfide (PAS) resin and a glass fiber and allows a decrease in mechanical strength to be suppressed even in a hot water environment and under acidic conditions, a PAS resin composition capable of providing such a molded article, and methods for producing the same. More specifically, provided are a PAS resin composition including, per 100 parts by mass of a PAS resin, 10 to 100 parts by mass of a glass fiber having, in the glass fiber, an MgO content of 6 mass % or more, a CaO content of 16 mass % or less, and an $R_2O$ content (the $R_2O$ content representing the total content of $LiO_2$, $Na_2O$, and $K_2O$) of 1 mass % or less, and 0.01 to 10 parts by mass of a silane coupling agent (C) blended as essential components; a molded article; and methods for producing the same.

12 Claims, No Drawings

POLYARYLENE SULFIDE RESIN COMPOSITION, MOLDED ARTICLE, AND METHODS FOR PRODUCING THESE

TECHNICAL FIELD

The present invention relates to a polyarylene sulfide resin composition, a polyarylene sulfide resin molded article, and methods for producing the same.

BACKGROUND ART

Polyarylene sulfide resins (hereinafter referred to as "PAS resins") represented by polyphenylene sulfide resins (hereinafter referred to as "PPS resins") are excellent in heat resistance, chemical resistance, and the like, and have been widely utilized for use in automotive parts, electrical and electronic parts, and water heater parts, for example. For such use, mechanical strength to replace metals is often required, and the resin is used in the form of a glass fiber-reinforced resin composition. However, although a PPS resin itself exhibits excellent heat resistance and chemical resistance, when used in contact with hot water or acidic or alkaline chemicals, the strength as a resin composition is greatly reduced, and thus its usage has been limited.

For this reason, a PPS resin composition having blended therein a glass fiber that contains 5 to 40 wt % $ZrO_2$ as a glass having excellent acid resistance and alkali resistance (see PTL 1) and a PPS resin composition having blended therein a glass fiber that has a $B_2O_3$ content set at 1 wt % or less to enhance water resistance (see PTL 2) have been provided.

Further, it is known that when a polysiloxane compound is further added to a PPS resin composition containing a PPS resin and a glass fiber, the acid resistance and alkali resistance are improved without impairing water resistance (see PTL 3).

CITATION LIST

Patent Literature

PTL 1: JPH10-7907A
PTL 2: JPH10-279800A
PTL 3: JP2001-115020A

SUMMARY OF INVENTION

Technical Problem

However, according to these methods, because glass fibers high in alkaline components are used, mechanical strength is significantly reduced in a hot water atmosphere and under acidic conditions, and also in the case where a polysiloxane compound is contained, due to its elution, durability reduction is caused.

Thus, an object of the invention is to provide a molded article that contains a PAS resin and a glass fiber and allows a decrease in mechanical strength to be suppressed even in a hot water environment and under acidic conditions, a PAS resin composition capable of providing such a molded article, and methods for producing the same.

Solution to Problem

The present inventors have conducted extensive research to achieve the above object. As a result, they have found that use of a glass fiber containing a specific component makes it possible to suppress a decrease in the mechanical strength of a PAS resin molded article containing a PAS resin and a glass fiber in a hot water atmosphere and under acidic conditions, and thus accomplished the invention.

That is, the invention relates to a polyarylene sulfide resin composition including a polyarylene sulfide resin (A), a glass fiber (B), and a silane coupling agent (C) blended as essential components, in which the glass fiber (B) is a glass fiber having, in the glass fiber, an MgO content of 6 mass % or more, a CaO content of 16 mass % or less, and an $R_2O$ content (the $R_2O$ content representing the total content of $LiO_2$, $Na_2O$, and $K_2O$) of 1 mass % or less, and, per 100 parts by mass of the polyarylene sulfide resin (A), the glass fiber (B) is within a range of 10 to 100 parts by mass, and the silane coupling agent (C) is within a range of 0.01 to 10 parts by mass.

In addition, the invention relates to a molded article obtainable by molding the polyarylene sulfide resin composition described above.

In addition, the invention relates to a method for producing a polyarylene sulfide resin composition, including a step of blending a polyarylene sulfide resin (A), a glass fiber (B), and a silane coupling agent (C) as essential components, followed by melt-kneading in a temperature range that is equal to or higher than the melting point of the polyarylene sulfide resin (A), the method for producing a polyarylene sulfide resin composition being characterized in that the glass fiber (B) is a glass fiber having, in the glass fiber, an MgO content of 6 mass % or more, a CaO content of 16 mass % or less, and an $R_2O$ content (the $R_2O$ content representing the total content of $LiO_2$, $Na_2O$, and $K_2O$) of 1 mass % or less, and, per 100 parts by mass of the polyarylene sulfide resin (A), the glass fiber (B) is within a range of 10 to 100 parts by mass, and the silane coupling agent (C) is within a range of 0.01 to 10 parts by mass.

In addition, the invention relates to a method for producing a molded article, including a step of producing a polyarylene sulfide resin composition by the method described above, and a step of melt-molding the resulting polyarylene sulfide resin composition.

Advantageous Effects of Invention

According to the invention, a molded article that contains a PAS resin and a glass fiber and allows a decrease in mechanical strength to be suppressed even in a hot water environment and under acidic conditions, a PAS resin composition capable of providing such a molded article, and methods for producing the same can be provided.

DESCRIPTION OF EMBODIMENTS

The PAS resin composition of the invention is a polyarylene sulfide resin composition that includes a polyarylene sulfide resin (A), a glass fiber (B), and a silane coupling agent (C) blended as essential components, in which the glass fiber (B) is a glass fiber having, in the glass fiber, an MgO content of 6 mass % or more, a CaO content of 16 mass % or less, and an $R_2O$ content (the $R_2O$ content representing the total content of $LiO_2$, $Na_2O$, and $K_2O$) of 1 mass % or less, and, per 100 parts by mass of the polyarylene sulfide resin (A), the glass fiber (B) is within a range of 10 to 100 parts by mass, and the silane coupling agent (C) is within a range of 0.01 to 10 parts by mass. Description will be given hereinafter.

The PAS resin composition of the invention has blended therein a PAS resin (A) as an essential component. The PAS resin (A) has a resin structure having, as a repeating unit, a structure in which an aromatic ring and a sulfur atom are attached. Specifically, the resin has, as a repeating unit, a structural moiety represented by the following general formula (1):

[Chemical formula 1]

Formula (1)

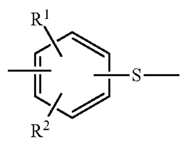

(in the formula, $R^1$ and $R^2$ each independently represent a hydrogen atom, an alkyl group having 1 to 4 carbon atoms, a nitro group, an amino group, a phenyl group, a methoxy group, or an ethoxy group) and, if necessary, further a trifunctional structural moiety represented by the following general formula (2):

[Chemical formula 2]

Formula (2)

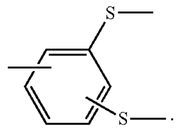

The trifunctional structural moiety represented by formula (2) is preferably within a range of 0.001 to 3 mol %, particularly preferably within a range of 0.01 to 1 mol %, relative to the total number of moles with other structural moieties.

Here, in the structural moiety represented by the above general formula (1), $R^1$ and $R^2$ in the formula are particularly preferably, hydrogen atoms in terms of the mechanical strength of the PAS resin. In that case, the structural moieties attached at the para position as represented by the following formula (3) and the structural moieties attached at the meta position as represented by the following formula (4), may be exemplified.

[Chemical formula 3]

Formula (3)

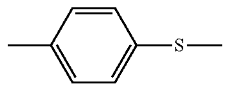

Formula (4)

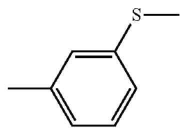

Among them, particularly with respect to the attachment of the sulfur atom to the aromatic ring in the repeating unit, a structure represented by the above general formula (3), which is the attachment at the para position, is preferable in terms of the heat resistance and crystallinity of the PAS resin.

In addition, the PAS resin (A) may also contain, in addition to the structural moieties represented by the above general formulas (1) and (2), structural moieties represented by the following structural formulas (5) to (8):

[Chemical formula 4]

Formula (5)

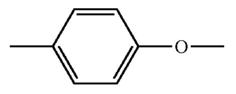

Formula (6)

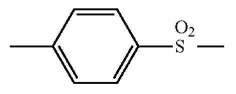

Formula (7)

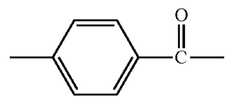

Formula (8)

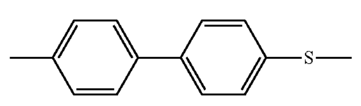

in an amount of 30 mol % or less of the total with the structural moieties represented by the above general formulas (1) and (2). In the invention, in terms of the heat resistance and mechanical strength of the PAS resin (A), it is particularly preferable that the structural moieties represented by the above general formulas (5) to (8) are 10 mol % or less. In the case where the PAS resin (A) contains the structural moieties represented by the above general formulas (5) to (8), the attachment mode thereof may be a random copolymer or a block copolymer.

In addition, the PAS resin (A) may have a naphthyl sulfide bond or the like in its molecular structure, but the amount thereof is preferably 3 mol % or less, particularly preferably 1 mol % or less, of the total number of moles with other structural moieties.

In addition, the physical properties of the PAS resin (A) are not particularly limited as long as the effects of the invention are not impaired, and are as follows.

(Melt Viscosity)

The melt viscosity of the PAS resin (A) used in the invention is not particularly limited. However, because the balance between fluidity and mechanical strength is improved, the melt viscosity (V6) measured at 300° C. is preferably within a range of 2 Pa·s or more, and is preferably within a range of 1,000 Pa·s or less, more preferably within a range of 500 Pas or less, and still more preferably within a range of 200 Pas or less. Note that the melt viscosity (V6) measurement is performed using a flow tester CFT-500D manufactured by Shimadzu Corporation, and is determined as a value of the melt viscosity of the PAS resin (A) measured after being held for 6 minutes at 300° C., load: $1.96\times10^6$ Pa, L/D=10 (mm)/1 (mm).

(Non-Newtonian Index)

The non-Newtonian index of the PAS resin (A) used in the invention is not particularly limited, but is preferably within a range of 0.90 or more and 2.00 or less. In the case where a linear PAS resin is used, the non-Newtonian index is preferably within a range of 0.90 or more, more preferably within a range of 0.95 or more, and preferably within a range of 1.50 or less, more preferably within a range of 1.20 or less. Such a PAS resin (A) is excellent in mechanical properties, fluidity, and abrasion resistance. Note that the non-Newtonian index (N-value) in the invention is a value calculated using the following equation from shear rate (SR) and shear stress (SS) measured using Capillograph under the following conditions: melting point+20° C., the ratio of orifice length (L) to orifice diameter (D) L/D=40. The closer the non-Newtonian index (N-value) is to 1, the more linear the structure is, and a higher non-Newtonian index (N-value) indicates a more branched structure.

$$SR = K \cdot SS^N \quad \text{[Equation 1]}$$

[Note that SR represents shear rate ($sec^{-1}$), SS represents shear stress ($dynes/cm^2$), and K is a constant.]

(Production Method)

Methods for producing the PAS resin (A) are not particularly limited. For example, (Production Process 1) a method in which in the presence of sulfur and sodium carbonate, a dihalogeno-aromatic compound is polymerized if necessary together with a polyhalogeno-aromatic compound or other copolymerization components added, (Production Process 2) a method in which in a polar solvent and in the presence of a sulfidating agent, a dihalogeno-aromatic compound is polymerized if necessary together with a polyhalogeno-aromatic compound or other copolymerization components added, (Production Process 3) a method in which p-chlorothiophenol is self-condensed if necessary together with other copolymerization components added, (Production Process 4) a method in which a diiodoaromatic compound and elemental sulfur are melt-polymerized while reducing the pressure in the presence of a polymerization inhibitor optionally having a functional group such as a carboxy group or an amino group, and the like can be mentioned. Among these methods, methods of (Production Process 2) are versatile and preferable. During the reaction, an alkali metal salt of carboxylic acid or sulfonic acid, or an alkali hydroxide, may be added in order to adjust the degree of polymerization. Among methods of the above (Production Process 2), particularly preferred are those obtained by a method in which a hydrous sulfidating agent is introduced into a mixture containing a heated organic polar solvent and a dihalogeno-aromatic compound at such a rate that water can be removed from the reaction mixture, then the dihalogeno-aromatic compound and the sulfidating agent, if necessary together with a polyhalogeno-aromatic compound added, are allowed to react in the organic polar solvent, and the moisture content in the reaction system is controlled within a range of 0.02 to 0.5 moles per mole of the organic polar solvent, thereby producing a PAS resin (A) (see JPH07-228699A), and a method in which in the presence of a solid alkali metal sulfide and an aprotic polar organic solvent, a dihalogeno-aromatic compound and, if necessary, a polyhalogeno-aromatic compound or other copolymerization components are added, and an alkali metal hydrosulfide and an organic acid alkali metal salt are allowed to react while controlling the organic acid alkali metal salt within a range of 0.01 to 0.9 moles per mole of the sulfur source and the moisture content in the reaction system within a range of 0.02 moles or less per mole of the aprotic polar organic solvent (see WO2010/058713). As specific examples of dihalogeno-aromatic compounds, p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and the above compounds with an alkyl group having 1 to 18 carbon atoms on the aromatic ring thereof can be mentioned. As polyhalogeno-aromatic compounds, 1,2,3-trihalobenzene, 1,2,4-trihalobenzene, 1,3,5-trihalobenzene, 1,2,3,5-tetrahalobenzene, 1,2,4,5-tetrahalobenzene, 1,4,6-trihalonaphthalene, and the like can be mentioned. In addition, as halogen atoms contained in the above compounds, chlorine atoms and bromine atoms are preferable.

Methods for post-treating the PAS resin (A)-containing reaction mixture obtained in the polymerization step are not particularly limited. For example, (Post-Treatment 1) a method in which after the completion of the polymerization reaction, first, from the reaction mixture as it is, or after adding an acid or a base, the solvent is distilled off under reduced pressure or normal pressure, and then the solid after distilling off the solvent is washed once or two or more times with a solvent such as water, the reaction solvent (or an organic solvent with comparable solubility for low-molecular-weight polymers), acetone, methyl ethyl ketone, or an alcohol, and further neutralized, washed with water, filtered, and dried, (Post-Treatment 2) a method in which after the completion of the polymerization reaction, a solvent such as water, acetone, methyl ethyl ketone, an alcohol, an ether, a halogenated hydrocarbon, an aromatic hydrocarbon, or an aliphatic hydrocarbon (a solvent that is soluble in the polymerization solvent used and is a poor solvent at least for PAS resins) is added to the reaction mixture as a precipitant to precipitate solid products such as a PAS resin and inorganic salts, and the products are then filtered, washed, and dried, (Post-Treatment 3) a method in which after the completion of the polymerization reaction, the reaction solvent (or an organic solvent with comparable solubility for low-molecular-weight polymers) is added to the reaction mixture, stirred, and then filtered to remove low-molecular-weight polymers, and then the mixture is washed once or two or more times with a solvent such as water, acetone, methyl ethyl ketone, or an alcohol, then neutralized, washed with water, filtered, and dried, (Post-Treatment 4) a method in which after the completion of the polymerization reaction, water is added to the reaction mixture, and the mixture is thus washed with water, filtered, then, if necessary, acid-treated with an acid added at the time of water washing, and dried, (5) a method in which after the completion of the polymerization reaction, the reaction mixture is filtered, then, if necessary, washed with the reaction solvent one or more times, further washed with water, filtered, and dried, and the like can be mentioned.

Incidentally, in the post-treatment methods mentioned above as examples in (Post-Treatment 1) to (Post-Treatment 5), the drying of the PAS resin (A) may be performed in vacuum, or may also be performed in air or in an inert gas atmosphere such as nitrogen.

The PAS resin composition of the invention has blended therein a glass fiber (B) as an essential component. The glass fiber (B) is a glass fiber (B) having an MgO content of more than 5 mass %, a CaO content of 16 mass % or less, and an $R_2O$ content of 1 mass % or less.

The MgO content in the glass fiber is more than 5 mass %, preferably 6 mass % or more. Then, the upper limit is not specified, but is preferably within a range of 15 mass % or less, and more preferably 10 mass % or less. In addition, the CaO content in the glass fiber is 16 mass % or less, preferably less than 16 mass %. Then, the lower limit is not specified, but may preferably be 13 mass % or more. Further, the $R_2O$ content in the glass fiber (note that $R_2O$ is a generic term for $LiO_2$, $Na_2O$, and $K_2O$. The $R_2O$ content represents the total content of $LiO_2$, $Na_2O$, and $K_2O$) is 1 mass % or less, preferably less than 1 mass %. Then, the lower limit is not specified, but may preferably be 0 mass %. When the MgO proportion in the glass fiber is high relative to the CaO content, and further the $R_2O$ content is within such a range, the elution of glass components in acidic, alkaline, and damp-heat environments is suppressed, and chemical resistance and mechanical strength can both be achieved.

The glass fiber may optionally contain $B_2O_3$. The $B_2O_3$ content in the glass fiber is not particularly limited as this is optional, but is preferably less than 1 mass %, and more preferably 0 mass %. As a result, the elution of glass components in acidic, alkaline, and damp-heat environments is suppressed, and chemical resistance and mechanical strength can both be further achieved.

The glass fiber may optionally contain alumina ($Al_2O_3$). The alumina content in the glass fiber is not particularly limited as this is optional, but is preferably within a range of mass % or more, more preferably 13 mass % or more, and 20 mass % or less, more preferably 16 mass % or less.

The remainder is composed of silicon oxide ($SiO_2$). The silicon oxide content is not particularly limited as long as it is the remainder other than the above components, but is preferably 65 mass % or less and preferably 60 mass % or more in the glass fiber.

As a result of blending such a glass fiber (B), a molded article excellent in damp-heat resistance, acid resistance, alkali resistance, and mechanical strength can be obtained.

The blending amount of the glass fiber (B) described above is, per 100 parts by mass of the PAS resin (A), preferably within a range of 10 parts by mass or more, more preferably 15 parts by mass or more, and still more preferably 30 parts by mass or more, and preferably within a range of 100 parts by mass or less, more preferably 80 parts by mass or less, and still more preferably 60 parts by mass or less. As a result of the blending amount of the glass fiber (B) being within these ranges, a molded article excellent in damp-heat resistance, acid resistance, alkali resistance, and mechanical strength can be obtained.

The PAS resin composition of the invention has blended therein a silane coupling agent (C) as an essential component. The silane coupling agent (C) used in the invention is not particularly limited as long as the effects of the invention are not impaired, but silane coupling agents having a functional group that reacts with a carboxy group, such as an epoxy group, an isocyanato group, an amino group, or a hydroxy group, can be mentioned as preferred examples. As such silane coupling agents, for example, epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane, isocyanato group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane; and hydroxy group-containing alkoxysilane compounds such as γ-hydroxypropyltrimethoxysilane and γ-hydroxypropyltriethoxysilane can be mentioned. Although the silane coupling agent (C) is not an essential component in the invention, when blended, the blending amount thereof is not particularly limited as long as the effects of the invention are not impaired, but is, per 100 parts by mass of the PAS resin (A), within a range of preferably 0.01 parts by mass or more, more preferably 0.1 parts by mass or more, and preferably 10 parts by mass or less, more preferably 5 parts by mass or less. Within such a range, a molded article excellent in damp-heat resistance, acid resistance, alkali resistance, and mechanical strength can be obtained.

The PAS resin composition of the invention may have blended therein a thermoplastic elastomer (D) as an optional component. As the thermoplastic elastomer, polyolefin-based elastomers, fluorine-based elastomers, and silicone-based elastomers can be mentioned, and, among them, polyolefin-based elastomers can be mentioned as preferred examples. The blending amount of the thermoplastic elastomer (D) is, per 100 parts by mass of the PAS resin (A), within a range of preferably 1 part by mass or more, more preferably 2 parts by mass or more, and preferably 20 parts by mass or less, more preferably 15 parts by mass or less. Within such a range, a molded article excellent in damp-heat resistance, acid resistance, alkali resistance, and mechanical strength, particularly in impact resistance, can be obtained.

As the polyolefin-based elastomers, for example, an α-olefin homopolymer, a copolymer of two or more α-olefins, and a copolymer of one or two or more α-olefins and a vinyl polymerizable compound having a functional group can be mentioned. At this time, as the α-olefin, α-olefins having 2 to 8 carbon atoms, such as ethylene, propylene, and 1-butene, can be mentioned. In addition, as the functional group, a carboxy group, an acid anhydride group (—C(=O)OC(=O)—), an epoxy group, an amino group, a hydroxy group, a mercapto group, an isocyanate group, an oxazoline group, and the like can be mentioned. Then, as the vinyl polymerizable compound having a functional group, one or two or more kinds of vinyl acetate; α,β-unsaturated carboxylic acids such as (meth)acrylic acid; alkyl esters of α,β-unsaturated carboxylic acids, such as methyl acrylate, ethyl acrylate, and butyl acrylate; metal salts of α,β-unsaturated carboxylic acids, such as ionomers (metals include alkali metals such as sodium, alkaline earth metals such as calcium, zinc, etc.); glycidyl esters of α,β-unsaturated carboxylic acids, such as glycidyl methacrylate; α,β-unsaturated dicarboxylic acids such as maleic acid, fumaric acid, and itaconic acid; derivatives of the above α,β-unsaturated dicarboxylic acids (monoesters, diesters, and acid anhydrides); and the like can be mentioned. The thermoplastic elastomers mentioned above may be used alone, and it is also possible to use a combination of two or more kinds.

In the invention, a fibrous filler other than the glass fiber (B) described above, which is an essential component, can be further blended as an optional component (hereinafter also referred to as "additional fibrous filler"). As such additional fiber fillers, for example, glass fibers other than the glass fiber (B) described above, carbon fibers, silane glass fibers, ceramic fibers, aramid fibers, metal fibers, and the like can be mentioned, and one or two or more kinds of them can be blended.

Although the fibrous filler is an optional component, when blended, the blending amount thereof is, per 100 parts by mass of the PAS resin (A), preferably within a range of 1 part by mass or more, more preferably 5 parts by mass or more, and still more preferably 15 parts by mass or more, and preferably within a range of 300 parts by mass or less, more preferably 200 parts by mass or less, and still more preferably 150 parts by mass or less. As a result of the blending amount of the fibrous filler being within these ranges, better effects can be obtained in terms of retaining the mechanical strength of a molded article.

As fibrous fillers, those processed with a surface treatment agent or a sizing agent can also be used. As a result, the adhesive force to the PAS resin (A) can be improved, and thus this is preferable. As the surface treatment agent or sizing agent, for example, at least one kind of polymer selected from the group consisting of silane compounds, titanate compounds, acrylic resins, urethane resins, and epoxy resins having a functional group such as an amino group, an epoxy group, an isocyanate group, or a vinyl group, etc., can be mentioned.

In the PAS resin composition of the invention, if necessary, an additional filler other than the glass fiber (B) described above, which is an essential component, and the additional fibrous filler, which is an optional component, can be further blended as an optional component (hereinafter also referred to as "additional filler"). As such additional fillers, known and commonly used materials can be used as long as the effects of the invention are not impaired, and, for example, fillers of various shapes, such as granular or plate-like fillers, and the like can be mentioned. In addition, non-fibrous fillers such as glass beads, glass flakes, barium sulfate, clay, pyrophyllite, bentonite, sericite, mica, mica, talc, attapulgite, ferrite, calcium silicate, calcium carbonate, glass beads, zeolite, milled fibers, and calcium sulfate can also be used.

Although the additional filler is not an essential component in the invention, when blended, the blending amount thereof is not particularly limited as long as the effects of the invention are not impaired. The blending amount of the additional filler is, for example, per 100 parts by mass of the PAS resin (A), within a range of preferably 1 part by mass or more, more preferably 10 parts by mass or more, and preferably 600 parts by mass or less, more preferably 200 parts by mass or less. Within such a range, the resin composition exhibits excellent mechanical strength and moldability, and thus this is preferable.

Further, the PAS resin composition of the invention may further have blended therein, in addition to the above components, according to the intended use, appropriately, a synthetic resin such as a polyester resin, a polyamide resin, a polyimide resin, a polyetherimide resin, a polycarbonate resin, a polyphenylene ether resin, a polysulfone resin, a polyethersulfone resin, a polyetheretherketone resin, a polyetherketone resin, a polyarylene resin, a polyethylene resin, a polypropylene resin, a polytetrafluoroethylene resin, a polydifluoroethylene resin, a polystyrene resin, an ABS resin, a phenol resin, a urethane resin, or a liquid crystal polymer as an optional component (hereinafter simply referred to as "synthetic resin"). Although the synthetic resin is not an essential component in the invention, when blended, the proportion thereof to be blended is not particularly limited as long as the effects of the invention are not impaired, and also differs depending on each purpose and cannot be unconditionally specified. For example, as the proportion of the synthetic resin to be blended in the resin composition of the invention, a range of 5 parts by mass or more and a range of 15 parts by mass or less per 100 parts by mass of the PAS resin (A), approximately, can be mentioned. In other words, the proportion of the PAS resin (A) relative to the total of the PAS resin (A) and the synthetic resin is, on a mass basis, preferably within a range of (100/115) or more, and more preferably within a range of (100/105).

In addition, the PAS resin composition of the invention may additionally have blended therein, if necessary, known and commonly used additives such as colorants, antistatic agents, antioxidants, heat stabilizers, UV stabilizers, UV absorbers, foaming agents, flame retardants, flame-retardant aids, rust preventives, and release agents (metal salts and esters of fatty acids having 18 to 30 carbon atoms including stearic acid and montanic acid, polyolefin-based waxes such as polyethylene) as optional components. These additives are not essential components, and may be appropriately adjusted and used according to the purpose and intended use without impairing the effects of the invention preferably within a range of 0.01 parts by mass or more and preferably within a range of 1,000 parts by mass or less, more preferably 100 parts by mass or less, and still more preferably 10 parts by mass or less, for example, per 100 parts by mass of the PAS resin (A).

The method for producing a polyarylene sulfide resin composition of the invention is a method for producing a polyarylene sulfide resin composition, including a step of blending a polyarylene sulfide resin (A), a glass fiber (B), and a silane coupling agent (C) as essential components, followed by melt-kneading in a temperature range that is equal to or higher than the melting point of the polyarylene sulfide resin (A), and is characterized in that the glass fiber (B) is a glass fiber having, in the glass fiber, an MgO content of 6 mass % or more, a CaO content of 16 mass % or less, and an $R_2O$ content (the $R_2O$ content representing the total content of $LiO_2$, $Na_2O$, and $K_2O$) of 1 mass % or less, and, per 100 parts by mass of the polyarylene sulfide resin (A), the glass fiber (B) is within a range of 10 to 100 parts by mass, and the silane coupling agent (C) is within a range of 0.01 to 10 parts by mass. Detailed description will be given hereinafter.

The method for producing a PAS resin composition of the invention includes a step of blending the above essential components, followed by melt-kneading in a temperature range that is equal to or higher than the melting point of the PAS resin (A). More specifically, the PAS resin composition of the invention has blended therein the essential components and, if necessary, other optional components. Methods for producing the resin composition used in the invention are not particularly limited, and a method in which the essential components and, if necessary, optional components are blended and melt-kneaded, more specifically, a method in which the components are uniformly dry-mixed in a tumbler, a Henschel mixer, or the like if necessary, then fed into a twin-screw extruder, and melt-kneaded can be mentioned.

Melt-kneading can be performed with heating to a temperature range where the resin temperature is equal to or higher than the melting point of the PAS resin (A) or higher, preferably to a temperature range of the melting point+10° C. or higher, or to a temperature within a range of more preferably the melting point+10° C. or higher, still more preferably the melting point+20° C. or higher, and preferably the melting point+100° C. or lower, more preferably the melting point+50° C. or lower.

As the melt-kneader, a twin-screw kneading extruder is preferable in terms of dispersibility and productivity. For example, it is preferable that melt-kneading is performed while appropriately adjusting the range of the resin component discharge rate at 5 to 500 (kg/hr) and the range of the screw rotation speed at 50 to 500 (rpm), and it is still more preferable that melt-kneading is performed under conditions where their ratio (discharge rate/screw rotation speed) is within a range of 0.02 to 5 (kg/hr/rpm). In addition, the components may be added to the melt-kneader and mixed simultaneously or separately. For example, in the case where, of the above components, the glass fiber (B), which is an essential component, and, if necessary, an additional fibrous filler are added, in terms of dispersibility, it is preferable that they are fed through the side feeder of the twin-screw kneading extruder into the extruder. As the position of the side feeder, it is preferable that the ratio of the distance from the extruder resin feed port (top feeder) to the side feeder relative to the total screw length of the twin-screw kneading extruder is 0.1 or more, more preferably 0.3 or more. In addition, the ratio is preferably 0.9 or less, and more preferably 0.7 or less.

The PAS resin composition according to the invention obtained by melt-kneading in this manner is a melted mixture containing the essential components described above, optional components added if necessary, and components derived therefrom. For this reason, the PAS resin composition of the invention has a morphology in which the PAS resin (A) forms a continuous phase, and other essential components and optional components are dispersed. It is preferable that the PAS resin composition according to the invention is, after the melt-kneading, processed by a known method in which, for example, the resin composition in a molten state is extruded into a strand, then processed into the form of pellets, chips, granules, a powder, or the like, and pre-dried in a temperature range of 100 to 150° C. if necessary.

The molded article of the invention is obtainable by melt-molding a PAS resin composition. In addition, the method for producing a molded article of the invention includes a step of melt-molding the PAS resin composition. For this reason, the molded article of the invention has a morphology in which the PAS resin (A) forms a continuous phase, and the essential components other than the PAS resin (A) and optional components are dispersed. As a result of the PAS resin composition having such a morphology, a molded article excellent in damp-heat resistance, acid resistance, alkali resistance, and mechanical strength can be obtained.

The PAS resin composition of the invention can be subjected to various types of molding, such as injection molding, compression molding, composite, sheet, pipe, or like extrusion molding, pultrusion molding, blow molding, and transfer molding, but is suitable for injection molding use because of its particularly excellent releasability. In the case of molding by injection molding, various molding conditions are not particularly limited, and molding can be performed by an ordinary general method. For example, it is possible that in an injection molding machine, the PAS resin composition is melted in a temperature range where the resin temperature is equal to or higher than the melting point of the PAS resin (A), preferably in a temperature range of the melting point+10° C. or higher, more preferably in a temperature range of the melting point+10° C. to the melting point+100° C., and still more preferably in a temperature range of the melting point+20° C. to the melting point+50° C., and, after such a step, injected into the die through a resin discharge port and molded. At this time, the die temperature may also be set in a known temperature range, for example, room temperature (23° C.) to 300° C., preferably at 120 to 180° C.

As products of the molded article of the PAS resin composition of the invention, for example, pipes for transporting fluids and various parts attached to pipes, such as pipes, lining pipes, cap nuts, pipe fittings (elbows, headers, tees, reducers, joints, couplers, etc.), various valves, flow meters, and gaskets (seals, packings), (also referred to as "parts for fluid transport" in the invention) can be mentioned. For this reason, for example, parts attached to internal combustion engines of automotive parts, such as fuel-related/exhaust system/intake system various pipes, air intake nozzle snorkels, intake manifolds, fuel pumps, engine cooling water joints, and water outlets, can be mentioned, and application for other various uses is also possible. Further, heat dissipation members for automotive engine control units and motors, heat dissipation members for LED substrates, heat sinks for various electrical/electronic device substrates, and the like are mentioned as examples. In addition, the molded article of the invention can be not only a heat dissipation member but also an ordinary resin molded article as follows. For example, electrical/electronic parts represented by protection/support members/multiple discrete semiconductors or modules for box-shaped electrical/electronic part integrated modules, sensors, LED lamps, connectors, sockets, resistors, relay cases, switches, coil bobbins, condensers, variable condenser cases, optical pickups, oscillators, various terminal strips, transformers, plugs, printed circuit boards, tuners, speakers, microphones, headphones, small motors, magnetic head bases, power modules, terminal blocks, semiconductors, liquid crystals, FDD carriages, FDD chassis, motor brush holders, parabolic antennas, computer-related parts, and the like; home and office electrical appliance parts represented by VTR parts, TV parts, irons, hair dryers, rice cooker parts, microwave oven parts, audio parts, audio/visual equipment parts including audio/laser discs/compact discs/DVD discs/Blu-ray discs, etc., lighting parts, refrigerator parts, air conditioner parts, typewriter parts, word processor parts, plumbing equipment parts including water heaters, bath water volume and temperature sensors, etc., and the like; machinery-related parts represented by office computer-related parts, telephone-related parts, facsimile-related parts, copier-related parts, cleaning jigs, motor parts, writers, typewriters, and the like; optical equipment- and precision machinery-related parts represented by microscopes, binoculars, cameras, watches, and the like; and automotive/vehicle-related parts such as alternator terminals, alternator connectors, brush holders, slip rings, IC regulators, potentiometer bases for light dimmers, relay blocks, inhibitor switches, carburetor main bodies, carburetor spacers, exhaust gas sensors, cooling water sensors, oil temperature sensors, brake pad wear sensors, throttle position sensors, crankshaft position sensors, air flow meters, brake pad wear sensors, thermostat bases for air conditioners, heating hot air flow control valves, brush holders for radiator motors, water pump impellers, turbine vanes, wiper motor-related parts, distributors, starter switches, ignition coils and their bobbins, motor insulators, motor rotors, motor cores, starter relays, wire harnesses for transmissions, window washer nozzles, air conditioner panel switchboards, coils for fuel-related electromagnetic valves, connectors for fuses, horn terminals, electrical component insulating plates, step motor rotors, lamp sockets, lamp reflectors, lamp housings, brake pistons, solenoid bobbins, engine oil filters, and ignition device cases can be mentioned, and application for other various uses is also possible.

EXAMPLES

Hereinafter, the invention will be described using examples and comparative examples, but is not limited these examples. Incidentally, hereinafter, unless otherwise specified, "%" and "parts" are by mass.

Examples 1 to 5 and Comparative Examples 1 and 2

The materials were blended according to the compositional components and blending amounts shown in Table 1. Subsequently, these blended materials were fed into a vented twin-screw extruder "TEX-30α (product name)" manufactured by The Japan Steel Works, Ltd., and melt-kneaded at a resin component discharge rate of 30 kg/hr, a screw rotation speed of 200 rpm, and a set resin temperature of 320° C. to give resin composition pellets. The glass fiber was fed through the side feeder, and other materials were uniformly mixed in advance in a tumbler and fed through the top feeder. The resin composition pellets obtained were dried in a gear oven at 140° C. for 2 hours and then injection-molded to prepare various test pieces, and the following tests were performed.

<Tensile Strength>

The obtained pellets were supplied to an injection molding machine (SE-75D-HP) manufactured by Sumitomo Heavy Industries, Ltd., set at a cylinder temperature of 310° C., and injection-molded using an ISO Type-A dumbbell piece molding die controlled at a die temperature of 140° C., thereby giving an ISO Type-A dumbbell piece. Incidentally, in order for the test piece to include no weld, the resin was injected from a single-point gate of the ISO D2 sheet in the preparation. The tensile strength of the obtained dumbbell piece was measured by the measuring methods in accordance with ISO 527-1 and 2.

<Flexural Strength, Flexural Modulus>

The flexural strength and flexural modulus of the above ISO TYPE-A dumbbell piece were measured by the measuring method in accordance with ISO 178.

<Impact Strength>

A central portion of a dumbbell-shaped test piece for tensile testing was cut out into a bar shape having a length of 80 mm, a width of 10 mm, and a thickness of 4 mm, then notched to prepare an impact resistance test piece, and subjected to the Charpy impact test in accordance with ISO179-1/1eA to measure the impact strength (kJ/mm$^2$).

<Linear Thermal Expansion Coefficient>

A central portion of a dumbbell-shaped test piece for tensile testing was cut out into a rectangular parallelepiped having a length of 10 mm, a width of 10 mm, and a thickness of 4 mm to prepare a linear thermal expansion coefficient test piece, and then subjected to measurement in accordance with ISO 11359-2 to measure the linear thermal expansion coefficient parallel to the flow direction in a measurement temperature range of −50 to 50° C.

<Acid Resistance Test>

A-Method: Tensile strength was measured after immersion in 46% hydrofluoric acid (Reagent Special Grade manufactured by FUJIFILM Wako Pure Chemical Corporation) at room temperature for 100 hours. Further, the tensile strength was divided by that before immersion to calculate the retention. The results are shown in Tables 1 and 2.

B-Method: Tensile strength was measured after immersion in Sanpoll stock solution (manufactured by Dainihon Jochugiku Co. Ltd., containing 9.5% hydrochloric acid and a surfactant (alkyltrimethyl ammonium)) at room temperature for 500 hours. Further, the tensile strength was divided by that before immersion to calculate the retention. The results are shown in Tables 1 and 2.

<Alkali Resistance Test>

C-Method: Tensile strength was measured after immersion in Domesto Germ Killing Cleaner stock solution (manufactured by Unilever Japan K.K., an alkaline detergent containing about 3.8% sodium hypochlorite, about 1.4% sodium hydroxide, and a surfactant (main component: alkylamine oxide)) at room temperature for 500 hours. Further, the tensile strength was divided by that before immersion to calculate the retention. The results are shown in Tables 1 and 2.

TABLE 1

| | | Example 1 | Example 2 | Example 3 | Example 4 |
|---|---|---|---|---|---|
| A1 | | 100 | 100 | — | — |
| A2 | | — | — | 100 | — |
| A3 | | — | — | — | 100 |
| A4 | | — | — | — | — |
| B1 | | 67.0 | 46.4 | 67.0 | 67.0 |
| B2 | | — | — | — | — |
| C1 | | 0.5 | 0.5 | 0.5 | 0.5 |
| D1 | | — | 7.7 | — | — |
| Tensile Strength | MPa | 200 | 155 | 201 | 198 |
| Flexural Strength | MPa | 296 | 243 | 298 | 291 |
| Flexural Modulus | GPa | 17.4 | 11.0 | 17.4 | 17.8 |
| Impact Strength | kJ/m$^2$ | 10.2 | 13.9 | 10.4 | 10.0 |
| Linear Thermal Expansion Coefficient | $\times 10^{-6}$/K | 12.1 | 14.0 | 12.4 | 11.9 |
| A-Method, Tensile Strength | MPa | 183 | 147 | 180 | 177 |
| Retention | % | 92% | 95% | 90% | 89% |
| B-Method, Tensile Strength | MPa | 194 | 153 | 194 | 193 |
| Retention | % | 97% | 99% | 97% | 97% |
| C-Method, Tensile Strength | MPa | 191 | 152 | 195 | 192 |
| Retention | % | 96% | 98% | 97% | 97% |

TABLE 2

| | | Example 5 | Comparative Example 1 | Comparative Example 2 |
|---|---|---|---|---|
| A1 | | — | 100 | 100 |
| A2 | | — | — | — |
| A3 | | — | — | — |
| A4 | | 100 | — | — |
| B1 | | 67.0 | — | — |
| B2 | | — | 67.0 | 46.4 |
| C1 | | 0.5 | 0.5 | 0.5 |
| D1 | | — | — | 7.7 |
| Tensile Strength | MPa | 192 | 192 | 151 |
| Flexural Strength | MPa | 278 | 276 | 230 |
| Flexural Modulus | GPa | 16.8 | 15.5 | 9.5 |
| Impact Strength | $kJ/m^2$ | 9.8 | 9.5 | 13.5 |
| Linear Thermal Expansion Coefficient | $\times 10^{-6}/K$ | 12.7 | 13.2 | 15.1 |
| A-Method, Tensile Strength | MPa | 165 | 152 | 127 |
| Retention | % | 86% | 79% | 84% |
| B-Method, Tensile Strength | MPa | 185 | 180 | 144 |
| Retention | % | 96% | 94% | 95% |
| C-Method, Tensile Strength | MPa | 180 | 176 | 140 |
| Retention | % | 94% | 92% | 93% |

Incidentally, the blending proportions of the components to be blended in Tables 1 and 2 are in parts by mass, and the following were used.

PAS resin component

Polyphenylene sulfide resin

A1: Melt viscosity: 56 Pa·s, non-Newtonian index: 1.07

A2: Melt viscosity: 180 Pa·s, non-Newtonian index: 1.07

A3: Melt viscosity: 7 Pa·s, non-Newtonian index: 1.07

A4: Melt viscosity: 700 Pa·s, non-Newtonian index: 1.60

(Production Example 1) Production of Polyphenylene Sulfide Resin (A1)

[Step 1]

Into a 150-liter autoclave equipped with a stirring blade connected to a pressure gauge, a thermometer, a condenser, a decanter, and a rectification tower, 33.075 parts by mass (225 parts by mole) of p-dichlorobenzene (hereinafter abbreviated as "p-DCB"), 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged. The temperature was raised to 173° C. over 5 hours with stirring in a nitrogen atmosphere, 27.300 parts by mass of water was distilled, and the autoclave was then sealed. p-DCB azeotropically distilled during dehydration was separated in the decanter and returned into the autoclave at any time. In the autoclave after the completion of dehydration, an anhydrous sodium sulfide composition in the form of fine particles was dispersed in p-DCB. The NMP content in this composition was 0.079 parts by mass (0.8 parts by mole), showing that 98 mol % (33.7 parts by mole) of the charged NMP had been hydrolyzed to a sodium salt of a ring-opened form of NMP (4-(methylamino)butyric acid) (hereinafter abbreviated as "SMAB"). The amount of SMAB in the autoclave was 0.147 parts by mole per mole of sulfur atoms present in the autoclave. In the case where the charged NaSH and NaOH are entirely converted to anhydrous $Na_2S$, the theoretical dehydration amount is 27.921 parts by mass. This shows that out of 0.878 parts by mass (48.8 parts by mole) of residual water in the autoclave, 0.609 parts by mass (33.8 parts by mole) had been consumed in the hydrolysis reaction between NMP and NaOH and did not exist as water in the autoclave, while the other 0.269 parts by mass (14.9 parts by mole) remained in the autoclave in the form of water or crystalline water. The moisture content in the autoclave was 0.065 moles per mole of sulfur atoms present in the autoclave.

[Step 2]

After the completion of the above dehydration step, cooling was performed to an internal temperature of 160° C., then 46.343 parts by mass (467.5 parts by mole) of NMP was charged, and the temperature was raised to 185° C. The moisture content in the autoclave was 0.025 moles per mole of the NMP charged in Step 2. When the gauge pressure reached 0.00 MPa, a valve connected to the rectification tower was opened, and the internal temperature was raised to 200° C. over 1 hour. At this time, the rectification tower outlet temperature was controlled at 110° C. or less by cooling and valve opening. A vapor mixture of distilled p-DCB and water was condensed in the condenser and separated in the decanter, and p-DCB was returned to the autoclave. The amount of water distilled was 0.228 parts by mass (12.7 parts by mole).

[Step 3]

The moisture content in the autoclave at the start of Step 3 was 0.041 parts by mass (2.3 parts by mole), which was 0.005 moles per mole of the NMP charged in Step 2 and 0.010 moles per mole of sulfur atoms present in the autoclave. The amount of SMAB in the autoclave was, as in Step 1, 0.147 moles per mole of sulfur atoms present in the autoclave. Next, the internal temperature was raised from 200° C. to 230° C. over 3 hours, followed by stirring at 230° C. for 1 hour, and then raised to 250° C., followed by stirring for 1 hour. The gauge pressure at the internal temperature of 200° C. was 0.03 MPa, and the final gauge pressure was 0.40 MPa. After cooling, out of the obtained slurry, 0.650 parts by mass was poured into 3 parts by mass (3 parts by liter) of water, stirred at 80° C. for 1 hour, and then filtered. This cake was stirred again with 3 parts by mass (3 parts by liter) of warm water for 1 hour, washed, and then filtered. This operation was repeated four times. To this cake, again, 3 parts by mass (3 parts by liter) of hot water and acetic acid were added to adjust the pH to 4.0, stirred for 1 hour, washed, and then filtered. This cake was stirred again with 3 parts by mass (3 parts by liter) of warm water for 1 hour, washed, and then filtered. This operation was repeated twice. Drying was performed using a hot air dryer at 120° C. overnight to give a white powdery PPS resin (A1). The melt viscosity of this polymer at 300° C. was 56 Pa·s. The non-Newtonian index was 1.07.

(Production Example 2) Production of Polyphenylene Sulfide Resin (A2)

[Step 1]

Into a 150-liter autoclave equipped with a stirring blade connected to a pressure gauge, a thermometer, a condenser, a decanter, and a rectification tower, 33.222 parts by mass (226 parts by mole) of p-DCB, 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged. The temperature was raised to 173° C. over 5 hours with stirring in a nitrogen atmosphere, 27.300 parts by mass of water was distilled, and the autoclave was then sealed. p-DCB azeotropically distilled during dehydration was separated in the decanter and returned into the autoclave at any time. In the autoclave after the completion of dehydration, an anhydrous sodium sulfide composition in the form of fine particles was dispersed in p-DCB. The NMP content in this composition was 0.079 parts by mass (0.8 parts by mole), showing that 98 mol % (33.7 parts by mole) of the charged NMP had been hydrolyzed to a ring-opened form SMAB of NMP. The amount of SMAB in the autoclave was 0.147 parts by mole per mole of sulfur atoms present in the autoclave. In the case where the charged NaSH and NaOH are entirely converted to anhydrous $Na_2S$, the theoretical dehydration amount is 27.921 parts by mass. This shows that out of 0.878 parts by mass (48.8 parts by mole) of residual water in the autoclave, 0.609 parts by mass (33.8 parts by mole) had been consumed in the hydrolysis reaction between NMP and NaOH and did not exist as water in the autoclave, while the other 0.269 parts by mass (14.9 parts by mole) remained in the autoclave in the form of water or crystalline water. The moisture content in the autoclave was 0.065 moles per mole of sulfur atoms present in the autoclave.

[Step 2]

After the completion of the above dehydration step, cooling was performed to an internal temperature of 160° C., then 46.343 parts by mass (467.5 parts by mole) of NMP was charged, and the temperature was raised to 185° C. The moisture content in the autoclave was 0.025 moles per mole of the NMP charged in Step 2. When the gauge pressure reached 0.00 MPa, a valve connected to the rectification tower was opened, and the internal temperature was raised to 200° C. over 1 hour. At this time, the rectification tower outlet temperature was controlled at 110° C. or less by cooling and valve opening. A vapor mixture of distilled p-DCB and water was condensed in the condenser and separated in the decanter, and p-DCB was returned to the autoclave. The amount of water distilled was 0.228 parts by mass (12.7 parts by mole).

[Step 3]

The moisture content in the autoclave at the start of Step 3 was 0.041 parts by mass (2.3 parts by mole), which was 0.005 moles per mole of the NMP charged in Step 2 and 0.010 moles per mole of sulfur atoms present in the autoclave. The amount of SMAB in the autoclave was, as in Step 1, 0.147 moles per mole of sulfur atoms present in the autoclave. Next, the internal temperature was raised from 200° C. to 230° C. over 3 hours, followed by stirring at 230° C. for 3 hours, and then raised to 250° C., followed by stirring for 1 hour. The gauge pressure at the internal temperature of 200° C. was 0.03 MPa, and the final gauge pressure was 0.40 MPa. After cooling, out of the obtained slurry, 0.650 parts by mass was poured into 3 parts by mass (3 parts by liter) of water, stirred at 80° C. for 1 hour, and then filtered. This cake was stirred again with 3 parts by mass (3 parts by liter) of warm water for 1 hour, washed, and then filtered. This operation was repeated four times. To this cake, again, 3 parts by mass (3 parts by liter) of hot water and acetic acid were added to adjust the pH to 4.0, stirred for 1 hour, washed, and then filtered. This cake was stirred again with 3 parts by mass (3 parts by liter) of warm water for 1 hour, washed, and then filtered. This operation was repeated twice. Drying was performed using a hot air dryer at 120° C. overnight to give a white powdery PPS resin (A2). The melt viscosity of this polymer at 300° C. was 180 Pa·s. The non-Newtonian index was 1.07.

(Production Example 3) Production of Polyphenylene Sulfide Resin (A3)

[Step 1]

Into a 150-liter autoclave equipped with a stirring blade connected to a pressure gauge, a thermometer, a condenser, a decanter, and a rectification tower, 35.868 parts by mass (244 parts by mole) of p-DCB, 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged. The temperature was raised to 173° C. over 5 hours with stirring in a nitrogen atmosphere, 27.300 parts by mass of water was distilled, and the autoclave was then sealed. p-DCB azeotropically distilled during dehydration was separated in the decanter and returned into the autoclave at any time. In the autoclave after the completion of dehydration, an anhydrous sodium sulfide composition in the form of fine particles was dispersed in p-DCB. The NMP content in this composition was 0.079 parts by mass (0.8 parts by mole), showing that 98 mol % (33.7 parts by mole) of the charged NMP had been hydrolyzed to a ring-opened form SMAB of NMP. The amount of SMAB in the autoclave was 0.147 parts by mole per mole of sulfur atoms present in the autoclave. In the case where the charged NaSH and NaOH are entirely converted to anhydrous $Na_2S$, the theoretical dehydration amount is 27.921 parts by mass. This shows that out of 0.878 parts by mass (48.8 parts by mole) of residual water in the autoclave, 0.609 parts by mass (33.8 parts by mole) had been consumed in the hydrolysis reaction between NMP and NaOH and did not exist as water in the autoclave, while the other 0.269 parts by mass (14.9 parts by mole) remained in the autoclave in the form of water or crystalline water. The moisture content in the autoclave was 0.065 moles per mole of sulfur atoms present in the autoclave.

[Step 2]

After the completion of the above dehydration step, cooling was performed to an internal temperature of 160° C., then 46.343 parts by mass (467.5 parts by mole) of NMP was charged, and the temperature was raised to 185° C. The moisture content in the autoclave was 0.025 moles per mole of the NMP charged in Step 2. When the gauge pressure reached 0.00 MPa, a valve connected to the rectification tower was opened, and the internal temperature was raised to 200° C. over 1 hour. At this time, the rectification tower outlet temperature was controlled at 110° C. or less by cooling and valve opening. A vapor mixture of distilled p-DCB and water was condensed in the condenser and separated in the decanter, and p-DCB was returned to the autoclave. The amount of water distilled was 0.228 parts by mass (12.7 parts by mole).

[Step 3]

The moisture content in the autoclave at the start of Step 3 was 0.041 parts by mass (2.3 parts by mole), which was 0.005 moles per mole of the NMP charged in Step 2 and 0.010 moles per mole of sulfur atoms present in the autoclave. The amount of SMAB in the autoclave was, as in Step 1, 0.147 moles per mole of sulfur atoms present in the autoclave. Next, the internal temperature was raised from 200° C. to 230° C. over 3 hours, followed by stirring at 230° C. for 1 hour, and then raised to 250° C., followed by stirring for 1 hour. The gauge pressure at the internal temperature of 200° C. was 0.03 MPa, and the final gauge pressure was 0.40 MPa. After cooling, out of the obtained slurry, 0.650 parts by mass was poured into 3 parts by mass (3 parts by liter) of water, stirred at 80° C. for 1 hour, and then filtered. This cake was stirred again with 3 parts by mass (3 parts by liter) of warm water for 1 hour, washed, and then filtered. This operation was repeated four times. To this cake, again, 3 parts by mass (3 parts by liter) of hot water and acetic acid were added to adjust the pH to 4.0, stirred for 1 hour, washed, and then filtered. This cake was stirred again with 3 parts by mass (3 parts by liter) of warm water for 1 hour, washed, and then filtered. This operation was repeated twice. Drying was performed using a hot air dryer at 120° C. overnight to give a white powdery PPS resin (A3). The melt viscosity of this polymer at 300° C. was 7 Pa·s. The non-Newtonian index was 1.07.

(Production Example 4) Production of Polyphenylene Sulfide Resin (A4)

Into a 150-liter autoclave equipped with a stirring blade and a bottom valve connected to a pressure gauge, a thermometer, and a condenser, 19.413 parts by mass of flaky sodium sulfide (60.3 mass % $Na_2S$) and 45.000 parts by mass of NMP were charged. The temperature was raised to 209° C. with stirring in a nitrogen stream, and 4.644 parts by mass of water was distilled (the remaining moisture content was 1.13 moles per mole of sodium sulfide). Subsequently, the autoclave was sealed and cooled to 180° C., and 22.05 parts by mass of p-DCB and 18.000 parts by mass of NMP were charged. At a liquid temperature of 150° C., the gauge pressure was increased to 0.1 MPa using a nitrogen gas, and a temperature rise was caused. The reaction was allowed to proceed at a liquid temperature of 260° C. for 3 hours with stirring, and the top of the autoclave was cooled with water spray. Next, the temperature was lowered, and, at the same time, the cooling of the top of the autoclave was stopped. During the cooling of the top of the autoclave, the liquid temperature was kept constant and prevented from falling. The maximum pressure during the reaction was 0.85 MPa.

After the reaction, cooling was performed. After cooling, out of the obtained slurry, 0.650 parts by mass was poured into 3 parts by mass (3 parts by liter) of water, stirred at 80° C. for 1 hour, and then filtered. This cake was stirred again with 3 parts by mass (3 parts by liter) of warm water for 1 hour, washed, and then filtered. This operation was repeated seven times. Drying was performed at 120° C. overnight using a hot air dryer.

Subsequently, a heat treatment was performed at 250° C. for 3 hours with a hot air dryer to give a PPS resin (A4). The melt viscosity of the obtained polymer was 700 Pa·s, and the non-Newtonian index was 1.60.

Glass Fiber

B1: Glass fiber manufactured by Nippon Electric Glass Co. Ltd., (MgO content: 8 wt %, CaO content: 14.5 wt %, $R_2O$ content: 0.5 wt % or less, $Al_2O_3$ content: 16 wt %, $SiO_2$: remainder), average fiber length: 3 mm, average fiber diameter: 10 μm B2: E-glass "T-717H" manufactured by Nippon Electric Glass Co. Ltd., (MgO content: 2.5 wt %, CaO content: 20.5 wt %, $R_2O$ content: 1.5 wt % or less, $Al_2O_3$ content: 14 wt %, $SiO_2$: remainder), average fiber length: 3 mm, average fiber diameter: 10 μm Silane Coupling Agent Cl: "SH-6040" 3-glycidoxypropyltrimethoxysilane manufactured by Dow Corning Corp.

Thermoplastic Elastomer

D1: "BONDFAST 7M" manufactured by Sumitomo Chemical Co., Ltd., containing 67 mass % ethylene, 6 mass % glycidyl methacrylate, and 27 mass % methyl acrylate as copolymerization components

The invention claimed is:

1. A polyarylene sulfide resin composition comprising a polyarylene sulfide resin (A), a glass fiber (B), and a silane coupling agent (C) blended as essential components, wherein the glass fiber (B) is a glass fiber having, in the glass fiber, an MgO content of 6 mass % or more, a CaO content of 16 mass % or less and 13 mass % or more, and an $R_2O$ content of 1 mass % or less, wherein the $R_2O$ content represents the total content of $LiO_2$, $Na_2O$, and $K_2O$, and, per 100 parts by mass of the polyarylene sulfide resin (A), the glass fiber (B) is within a range of 10 to 100 parts by mass, and the silane coupling agent (C) is within a range of 0.01 to 10 parts by mass.

2. The polyarylene sulfide resin composition according to claim 1, wherein a thermoplastic elastomer (D) is further blended as an essential component with the polyarylene sulfide resin (A), the glass fiber (B), and the silane coupling agent (C), and the thermoplastic elastomer (D) is within a range of 1 to 20 parts by mass per 100 parts by mass of the polyarylene sulfide resin (A).

3. The polyarylene sulfide resin composition according to claim 1, being a melt-kneaded product.

4. A molded article obtainable by molding the polyarylene sulfide resin composition according to claim 1.

5. A method for producing the polyarylene sulfide resin composition according to claim 1, comprising a step of blending a polyarylene sulfide resin (A), a glass fiber (B), and a silane coupling agent (C) as essential components, followed by melt-kneading in a temperature range that is equal to or higher than the melting point of the polyarylene sulfide resin (A), the method for producing a polyarylene sulfide resin composition being configured such that the glass fiber (B) is a glass fiber having, in the glass fiber, an MgO content of 6 mass % or more, a CaO content of 16 mass % or less and 13 mass % or more, and an $R_2O$ content of 1 mass % or less, wherein the $R_2O$ content represents the total content of $LiO_2$, $Na_2O$, and $K_2O$, and, per 100 parts by mass of the polyarylene sulfide resin (A), the glass fiber (B) is within a range of 10 to 100 parts by mass, and the silane coupling agent (C) is within a range of 0.01 to 10 parts by mass.

6. The method for producing a polyarylene sulfide resin composition according to claim 5, wherein a thermoplastic elastomer (D) is further blended as an essential component with the polyarylene sulfide resin (A), the glass fiber (B), and the silane coupling agent (C), and the thermoplastic elastomer (D) is within a range of 1 to 20 parts by mass per 100 parts by mass of the polyarylene sulfide resin (A).

7. A method for producing a molded article, comprising a step of producing a polyarylene sulfide resin composition by the method according to claim 5, and a step of melt-molding the resulting polyarylene sulfide resin composition.

8. The polyarylene sulfide resin composition according to claim 2, being a melt-kneaded product.

9. A molded article obtainable by molding the polyarylene sulfide resin composition according to claim 2.

10. A molded article obtainable by molding the polyarylene sulfide resin composition according to claim 3.

11. A molded article obtainable by molding the polyarylene sulfide resin composition according to claim 8.

12. A method for producing a molded article, comprising a step of producing a polyarylene sulfide resin composition by the method according to claim 6, and a step of melt-molding the resulting polyarylene sulfide resin composition.

* * * * *